Oct. 8, 1963 S. FRIEDRICH 3,106,679
CONTROL ARRANGEMENT FOR PREVENTING IMPROPER REGULATION OF AN INTERMEDIATE AMPLIFIER STATION
Filed Jan. 24, 1962
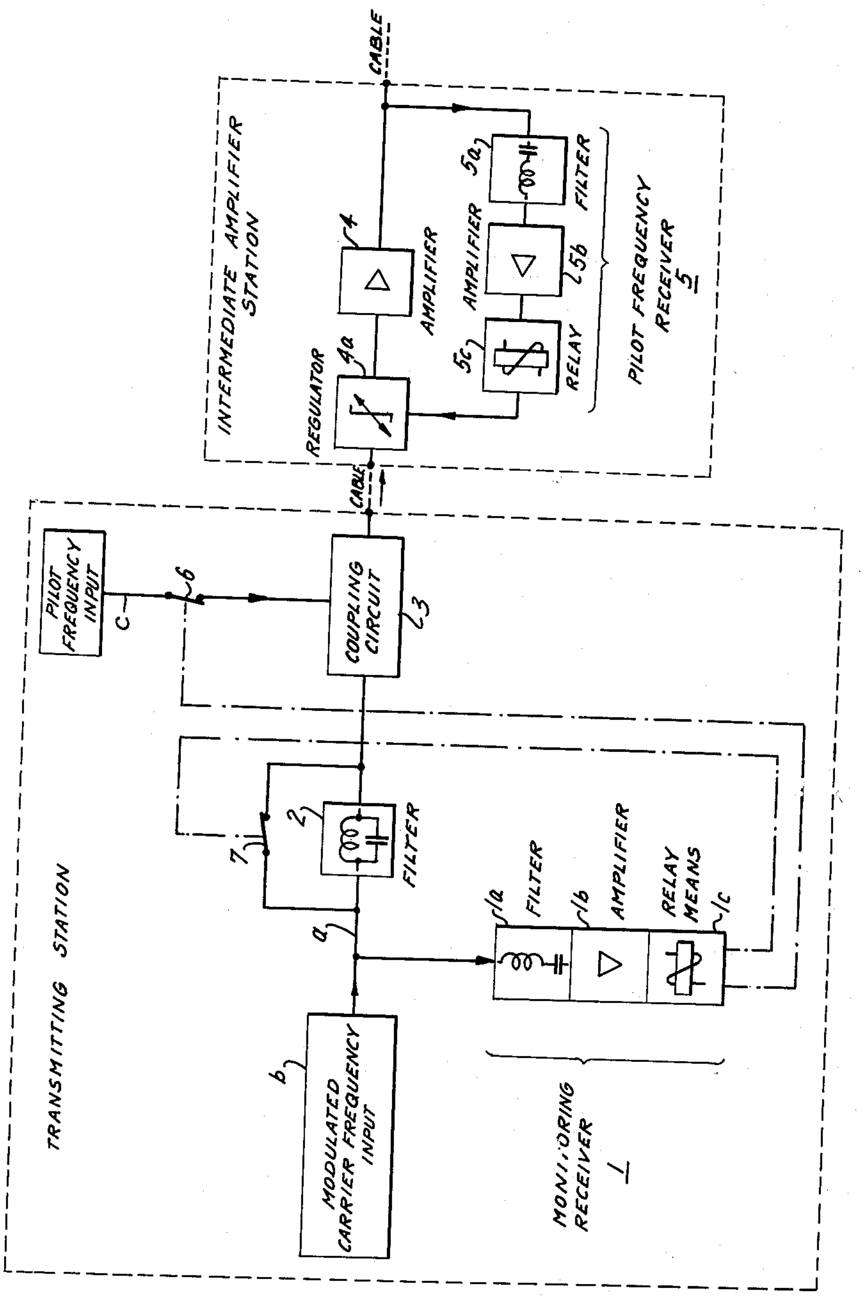
INVENTORS:
Siegfried Friedrich
BY
Michael S. Striker
Attorney 3,106,679
Patented Oct. 8, 1963

3,106,679

CONTROL ARRANGEMENT FOR PREVENTING IMPROPER REGULATION OF AN INTERMEDIATE AMPLIFIER STATION

Siegfried Friedrich, Nurnberg, Germany, assignor to Felten & Guilleaume Fernmeldeanlagen G.m.b.H., Nurnberg, Germany Filed Jan. 24, 1962, Ser. No. 168,839
Claims priority, application Germany Jan. 24, 1961
5 Claims. (Cl. 325—2)

The present invention concerns a control arrangement for carrier-frequency operated transmission systems, and more particularly for systems having at least one pilot frequency controlled intermediate amplifier station. The control arrangement according to the invention is intended to prevent improper regulation of an intermediate amplifier station in the case of accidental appearance of signal frequency components in the narrow channel reserved for the pilot frequency transmission. The arrangement is particularly useful in the transmission of video signals through a carrier-frequency transmission system.

As is well known for carrier-frequency operated transmission systems, particularly for the transmission of television signals via coaxial cables, intermediate amplifier stations are arranged along cable lines of comparatively great length. These intermediate stations are usually not manned and require therefore automatic amplification regulation. Conventionally such regulation devices are controlled by pilot signals introduced at the transmitter end of the cable connection at one or several selected pilot frequencies. In the intermediate amplifier stations the pilot signals are tapped off and passed through a pilot frequency receiver and amplifier having a narrow range selectively corresponding to the pilot frequency channel, and the amplitude of the received pilot signals is monitored and the pilot signal is then applied accordingly to the regulation device of the amplifier station for regulating its amplification.

In order to free the transmission of the pilot signal of detrimental influences by components of the signal frequency band by which the carrier-frequency is modulated, it has been tried to assign to the pilot signal frequencies which are located outside the actual signal frequency band, particularly outside a video signal frequency band. However, it has been found that it is technically very difficult to obtain satisfactory results in this manner. Therefore, at least one predetermined narrow frequency range within said signal frequency band is chosen to be left unused for modulation purposes and is reserved as a pilot signal channel. However, practical experience has shown that the unavoidable or usually tolerated inaccuracy of the horizontal scanning frequency in video signals causes frequency components of the video signal to penetrate into the pilot signal channel, at least for brief periods of time. Such interfering signal frequency components are superimposed on the pilot signal so as to affect the intended amplitude of the pilot signal whereby improper regulation of the intermediate amplifier station or stations is effected.

Of course, such improper effect on the regulating device of an intermediate amplifier station could be prevented by giving the pilot signal receiver and amplifier in the intermediate amplifier station a high degree of selectivity, e.g. by using therein expensive, high quality quartz filters. However, this method is highly uneconomical because in long cable lines a great number of intermediate amplifier stations and consequently a great number of these expensive filters would be needed. And even then the disturbance of the intended regulation cannot be avoided completely. One could also arrange at the transmitter end of the transmission line, ahead of the point where a pilot signal frequency is introduced, a narrow band suppression filter permanently so that it suppresses those portions of the entire video signal band which would be located in the frequency passing range of the quartz filter in the pilot signal receiver in an intermediate amplifier station. However, this would entail the drawback that such a suppression filter deteriorates the quality of the picture produced by the video signal. This is particularly true because depending upon the suppressing range of such a filter marginal distortions of the signal are caused, and the video signal is distorted by considerable phase shift. Such phase shift may be prevented or compensated but only at the expense of rather involved circuit arrangements.

It is therefore one of the objects of this invention to provide for a control arrangement which avoids all the above mentioned difficulties.

It is a further object of the invention to provide for a control arrangement of the type set forth which avoids the need for a quartz filter in the intermediate amplifier station and the use of a permanently inserted suppression filter at the transmitter end.

It is still another object of this invention to provide for a control arrangement of the above type which is comparatively simple in its construction and entirely reliable in operation.

With above objects in view the invention includes a control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range; monitoring means connected to a junction point between said input means and said coupling means for monitoring said signal modulated carrier-frequency and for actuating said control means as long as at said junction point a signal component appears which has a frequency located within said predetermined narrow frequency range; and at least one intermediate amplifier station arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which an embodiment of the invention is illustrated by a block diagram.

The diagram illustrates a transmission system comprising a transmitting station, a cable line and at least one intermediate amplifier station, as shown. In the transmitting station a transmission line portion *a* emanates from the modulated carrier-frequency input *b* and leads to the first cable connection which connects the transmitting station with the first intermediate amplifier station. Inserted into the transmission line portion *a* is a coupling circuit 3 which serves to apply to the carrier-frequency a pilot signal furnished from the pilot frequency input *c*. A normally closed switch member 6, described further below, is inserted in the connection between the pilot frequency input *c* and the coupling circuit 3. Connected with a junction point in the line *a* between the input *b* and the coupling circuit 3 is a monitoring receiver arrangement 1 composed of a filter 1*a*, an amplifier 1*b* and relay means 1*c*. Assuming that within the signal frequency band by which the carrier frequency furnished by the input *b* is modulated, a predetermined narrow frequency range is left unused for modulation and reserved to form a channel for the pilot signal frequency or frequencies, the filter 1*a* is designed to pass only frequencies which are located within said predetermined narrow frequency range. Hereby the selectivity of the monitoring receiver 1 is determined. When signal frequency components accidentally appear within the above mentioned narrow frequency range at the above mentioned junction point, then the monitoring receiver 1 responds and energizes the relay means 1*c*. The above mentioned switch contact 6 is operable by the relay means 1*c* so that whenever the relay means 1*c* are energized the switch contact 6 is moved to open position so as to interrupt the application of a pilot signal through the carrier-frequency in the coupling circuit 3.

The intermediate amplifier station comprises, as known, an amplifier 4 for receiving and relaying to the remaining part of the transmission system the signal modulated carrier-frequency. The regulator device 4*a* is provided for regulating the amplification of amplifier 4 depending upon a pilot signal also received by the intermediate amplifier station. For this purpose this station contains also a pilot frequency receiver arrangement 5 including a filter 5*a*, an amplifier 5*b* and a relay device 5*c*. The filter 5*a* is also designed to pass only frequencies located within the above mentioned predetermined narrow frequency range reserved as a pilot signal channel and determines for the pilot frequency receiver a selectivity substantially equal to that of the monitoring receiver 1 in the transmitting station. The pilot frequency receiver arrangement 5 is so connected with the transmission line passing through the intermediate amplifier station that, when signals are received which have a frequency located within said predetermined narrow frequency band, the relay device 5*c* is energized and actuates correspondingly the regulator arrangement 4*a* for correspondingly adjusting the amplification of the amplifier 4. It is to be understood that the intermediate amplifier station is so constructed that a regulation of the amplifier 4 takes place only when the amplitude of the pilot signal varies within predetermined limits. However, when the amplitude of the pilot signal drops below a certain minimum level or to zero then no regulation takes place at all.

It can be seen now that, whenever signal frequency components penetrate into the pilot frequency channel and appear at the above mentioned junction point to which the monitoring receiver 1 is connected, the latter will energize its relay means 1*c* and thereby open the switch 6 and thus interrupt the application of the pilot frequency signal to the carrier-frequency in the coupling circuit 3. Thus in this case an improper regulation of the amplifier 4 in the intermediate amplifier station by a signal composed of the actual pilot signal and a superimposed signal frequency component appearing accidentally at the above mentioned junction point, usually only for comparatively brief periods of time, is prevented.

In certain cases it is desirable to further improve the function of the above described control arrangement by arranging in the transmission line portion *a* between the above mentioned junction point and the coupling circuit 3 a suppression filter 2 which is designed to suppress any signals appearing at the junction point and having a frequency located within the above mentioned predetermined narrow frequency range. However, in order to avoid any interference of this suppression filter with the actual modulating frequency, particularly with a video frequency band, the filter 2 is normally shunted by a normally closed switch contact 7 arranged in a by-pass circuit as shown. This switch contact 7 is also controlled by the relay means 1*c*.

It can be seen that the just described arrangement comprising the filter 2 and the normally shunting switch contact 7 can be used advantageously in the absence of the above described switch contact 6. As a matter of fact, this is even preferable whenever one has to expect that interfering frequency components of the video signal band may appear at the above mentioned junction point having an amplitude substantially of the same order as the normal pilot signal, or even a larger amplitude, because in that case even opening of the switch contact 6 would not prevent an improper control of the regulator 4*a* of the intermediate amplifier station.

On the other hand, if one can fairly assume that the amplitude of interfering signal frequency components will rarely reach or exceed the minimum amplitude level which would cause the pilot frequency receiver 5 to actuate the regulator 4*a*, then it would be desirable to render the filter 2 operative for as brief a period as possible and only when necessary. In this case it is advisable to provide relay means 1*c* which operate like two separate relays. The first relay portion is in this case designed to operate the switch contact 6 and to interrupt the application of the pilot signal to the carrier frequency, whenever signal frequency components appear in the pilot signal channel so as to increase the pilot signal amplitude up to a predetermined amount whereby an improper regulation of the amplifier 4 would be effected. However, when interfering signal frequency components appear in the pilot signal channel with an amplitude equal to or exceeding the minimum amplitude level required to actuate the regulator 4*a*, then the second relay portion would respond and open the shunting switch contact 7 so as to render the filter 2 operative.

Since in the above discussed cases ordinarily the suppression filter 2 will have to be rendered operative in the transmission circuit only for very brief periods of time, complicated phase correction devices cooperating with the filter 2 may be dispensed with.

While it has been stated above that the control arrangement according to the invention is of particular advantage in transmission systems for transmitting video signal modulated carrier frequencies, it should be understood that the control arrangement according to the invention is generally applicable to any transmission system for other types of signals and comprising pilot signal controlled regulators.

It will be understood that each of the elements described above, or two or more together, may also find a useful application in other types of a control arrangement for carrier-frequency operated transmission systems differing from the types described above.

While the invention has been illustrated and described as embodied in a control arrangement for carrier-frequency operated transmission systems including a transmitter station and at least one pilot frequency controlled and regulated intermediate amplifier station, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range; monitoring means connected to a junction point between said input means and said coupling means for monitoring said signal modulated carrier-frequency and for actuating said control means as long as at said junction point a signal component appears which has a frequency located within said predetermined narrow frequency range; and at least one intermediate amplifier station arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

2. A control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range; monitoring means having a predetermined first selectivity and connected to a junction point between said input means and said coupling means for monitoring said signal modulated carrier-frequency and for actuating said control means as long as at said junction point a signal component appears which has a frequency located within said predetermined narrow frequency range; and at least one intermediate amplifier station having a selectivity substantially equal to said first selectivity, arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

3. A control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range and including means for interrupting the application of said pilot signal to said carrier-frequency; monitoring means having a predetermined first selectivity and connected to a junction point between said input means and said coupling means for monitoring said signal modulated carrier-frequency and for actuating said control means as long as at said junction point a signal component appears which has a frequency located within said predetermined narrow frequency range; and at least one intermediate amplifier station having a selectivity substantially equal to said first selectivity, arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

4. A control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range and including filter means connected in said transmission line between said input means and said coupling means for suppressing a signal within said frequency range, said filter means being normally shunted and being rendered operative when said control means are actuated; monitoring means having a predetermined first selectivity and connected to a junction point between said input means and said filter means for monitoring said signal modulated carrier-frequency and for actuating said control means as long as at said junction point a signal component appears which has a frequency located within said predetermined narrow frequency range; and at least one intermediate amplifier station have a selectivity substantially equal to said first selectivity, arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

5. A control arrangement for carrier-frequency operated transmission systems including a transmitter station and at least one pilot frequency controlled and regulated intermediate amplifier station, for preventing improper regulation of said intermediate amplifier station, comprising, in combination, input means for introducing a carrier-frequency modulated by a signal frequency band with at least one predetermined narrow frequency range within said band left unused for modulation; a transmission line emanating from said input means; means for furnishing a pilot signal of a frequency located within said predetermined narrow frequency range; coupling means arranged at the starting end of said transmission line for applying said pilot signal to said carrier-frequency; control means actuatable for preventing, when actuated, the transmission of a signal at a frequency located within said predetermined narrow frequency range and including filter means connected in said transmission line between said input means and said coupling means for suppressing a signal within said frequency range, said filter means being normally shunted and being rendered operative when said control means are actuated, said control means further including means for interrupting the application of said pilot signal to said carrier-frequency; monitoring means having a predetermined first selectivity and connected to a junction point between said input means and said filter means for monitoring said signal modulated carrier-frequency and for actuating said control means as long as at said junction point a signal component appears which has a frequency located within said predetermined narrow frequency range; and at least one intermediate amplifier station having a selectivity substantially equal to said first selectivity, arranged within said transmission line for receiving and relaying said signal modulated carrier-frequency and including pilot signal receiver means responding only to frequencies located within said predetermined narrow frequency range and regulator means controlled by said pilot signal as received by said receiver means, for regulating the operation of said intermediate amplifier station.

References Cited in the file of this patent

UNITED STATES PATENTS

| | | |
|---|---|---|
| 1,882,653 | Sedlmayer | Oct. 11, 1932 |
| 2,065,826 | Roosenstein et al. | Dec. 29, 1936 |
| 2,382,588 | Thornton et al. | Aug. 14, 1945 |